United States Patent [19]

Boardman

[11] Patent Number: 5,560,670
[45] Date of Patent: Oct. 1, 1996

[54] TOP BOW TACK STRIP

[75] Inventor: Robert A. Boardman, Pittsford, Mich.

[73] Assignee: Dura Convertible Systems, Inc., Adrian, Mich.

[21] Appl. No.: 308,688

[22] Filed: Sep. 19, 1994

[51] Int. Cl.⁶ .................................................. B60J 7/12
[52] U.S. Cl. .............................. 296/118; 52/376; 160/264
[58] Field of Search ............................ 296/104, 118, 296/107; 135/132, 133, 136, 128, 117; 428/67, 68, 69, 70, 71, 72, 73, 74, 75, 76; 52/376; 160/264

[56] References Cited

U.S. PATENT DOCUMENTS

| | | | |
|---|---|---|---|
| 2,137,460 | 11/1938 | Reid | 189/40 |
| 2,538,931 | 1/1951 | Zummach | 296/118 |
| 5,427,429 | 6/1995 | Piontek et al. | 296/118 |

Primary Examiner—David M. Mitchell
Assistant Examiner—Kia M. Robinson
Attorney, Agent, or Firm—David A. Greenlee

[57] ABSTRACT

A convertible top bow comprises an elongated U-shaped metal channel defining a trough bounded by a pair of spaced side walls interconnected at their bottom ends by a bottom wall. An elongated plastic tacking strip has a generally-trapezoidal main body received in the channel. The main body has an upper tacking surface for receiving staples to secure a fabric top to the bow. The tacking strip is secured to the channel by deforming the upper ends of the channel side walls inwardly to clinch the tacking strip body beneath the wings. The tacking strip has a pair of upwardly convex curved wings extending from the depressed upper tacking surface up and over the upper edges of the channel sides. This isolates the channel tops from engagement with the fabric cover and provides bearing surfaces for the fabric cover as it moves over the bow during top movement.

6 Claims, 1 Drawing Sheet

U.S. Patent	Oct. 1, 1996	5,560,670
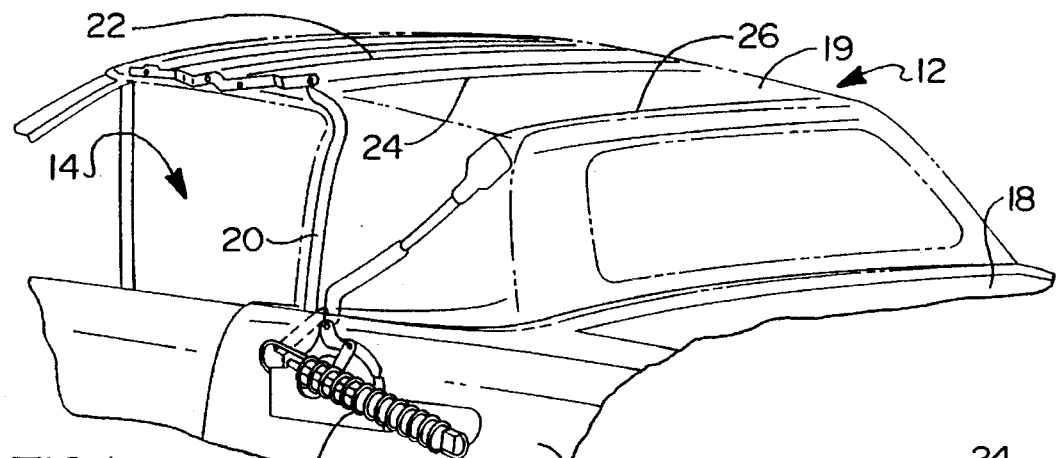
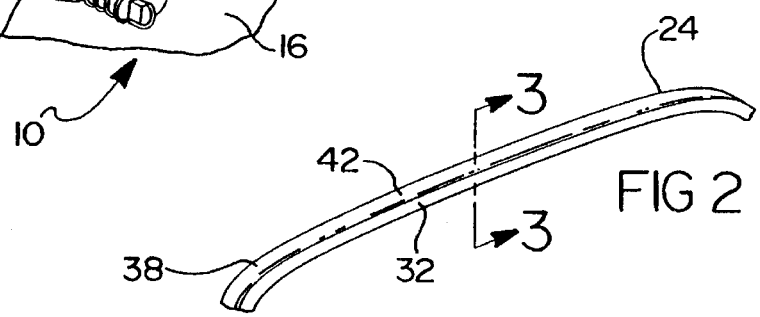
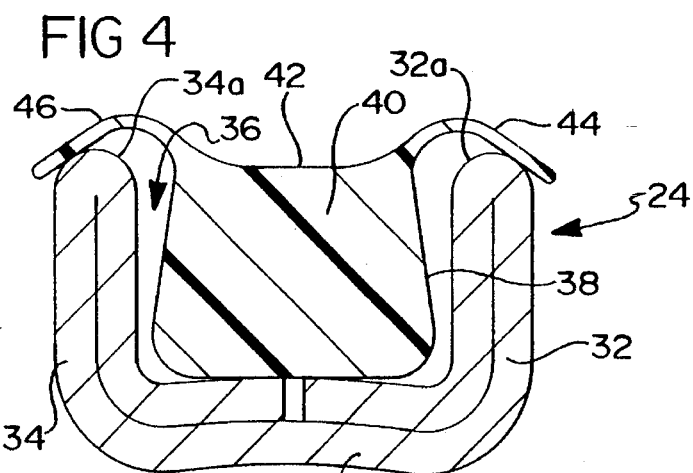
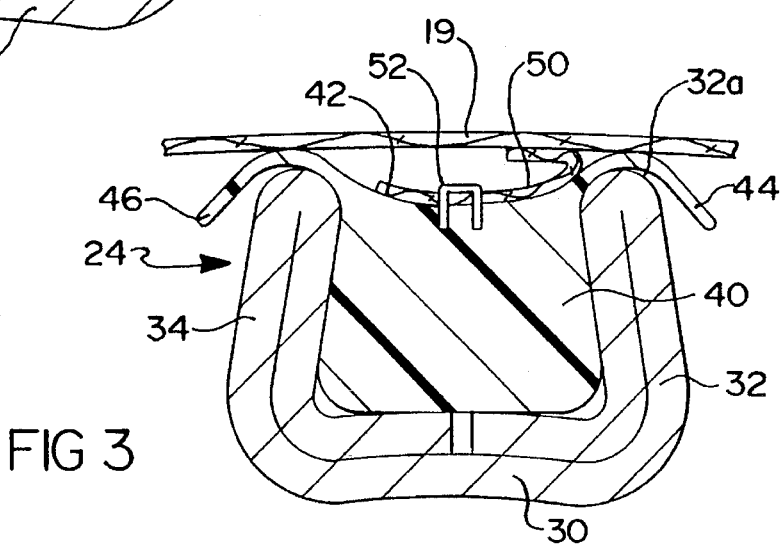

TOP BOW TACK STRIP

BACKGROUND OF THE INVENTION

This invention relates generally to vehicle convertible tops and, more particularly, to a tack strip for a transverse bow used in such a top.

Vehicle convertible tops generally comprise a collapsible frame which supports a fabric cover to cover the vehicle passenger compartment in top raised position. The top is lowered manually or by power actuators into a storage well behind the passenger compartment.

The collapsible frame usually comprises articulated side linkages which are interconnected by a front header and a plurality of longitudinally spaced cross bows. In the top trimming operation, the fabric cover is attached at its front to the header and at its rear to the vehicle body, in some tops, or to the rear bow in others. The fabric cover is then attached by securing fabric flaps on the top cover to the cross bows so that the cover will neatly and compactly fold for storage.

Many of these cross bows comprise a formed metal channel which encompasses a plastic tacking strip. The top attachment flaps are conventionally tacked or stapled to the exposed tacking surface of the tacking strip. During trimming and during subsequent top movement (i.e. raising or lowering), the portion of the fabric top adjacent the bows rubs against and over the bows as the fabric is shifted or folds and unfolds.

Since the bows are formed (rolled) metal sections, they sometimes have ragged edges, cuts, nicks, or other irregularities. Unless these irregularities are removed, they will quickly or eventually snag or cut the top fabric. The fabric cover will then have to be removed and replaced, which is time consuming and expensive.

To reduce the possibility of having such channel flaws, manufacturers inspect the channels and grind off any such flaws that are found. However, such inspection is cursory and is usually accomplished by the trimming personnel, who do not necessarily find or completely remove all the flaws. Thus, this procedure adds cost to the trimming process and is not completely effective.

It would be desirable to provide a top bow which will not snag or tear the top fabric.

SUMMARY OF THE INVENTION

It is therefore an object of this invention to provide a top bow which will not snag or tear the top fabric.

In one aspect, this invention features a convertible top bow which comprises an elongated U-shaped metal channel defining a trough bounded by a pair of spaced side walls interconnected at their bottom ends by a bottom wall. An elongated plastic tacking strip having a main body is received in the channel for receiving fasteners to secure a fabric top to the bow. The tacking strip has a pair wings extending outwardly to isolate the channel tops from engagement with the fabric cover.

In another aspect, this invention features a tacking strip having a main body with a generally trapezoidal cross section with the wings extending laterally from a narrow upper tacking surface. The tacking strip is secured to the channel by deforming the upper ends of the channel side walls inwardly to clinch the tacking strip body beneath the wings.

Preferably, the tacking strip wings are convex upwardly and extend from the body to extend over and downwardly to embrace and overlie the tops of the channel sides.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 is a perspective view of a portion of a convertible vehicle having a collapsible top including top bows according to this invention;

FIG. 2 is a perspective view of one of the bows shown in FIG. 1;

FIG. 3 is an enlarged sectional view, taken along the line 3—3 of FIG. 2; and

FIG. 4 is a view similar to FIG. 3, but illustrating the bow before final forming.

DETAILED DESCRIPTION OF A PREFERRED EMBODIMENT

A convertible vehicle 10 has a collapsible top 12 movable between the illustrated raised position, covering the vehicle passenger compartment 14, and a lowered position in a storage compartment (not shown) rearwardly in vehicle body 16 between passenger compartment 14 and trunk lid 18. Collapsible top 12 comprises a fabric 19 covering a framework which includes spaced articulated side linkages 20 and connecting cross bows 22, 24 and 26. Top 12 may be raised and lowered manually or by a power operator 28, which is more fully disclosed in U.S. Pat. No. 5,067,768 - Fischbach.

The bows 22 and 26 are all preferably of the same construction as bow 24, which is illustrated in detail in FIGS. 3 and 4. Bow 24 comprises a roll-formed metal (steel or aluminum) channel having a base 30 interconnecting upstanding legs 32 and 34, forming a trough 36. A polyethylene or other suitable plastic elongated tack strip 38 comprises a trapezoidal main body 40 having a pair of curved side wings 44 and 46 and an upper tacking surface 42.

Trough 36 is initially rectangular, as shown in FIG. 4. This enables tack strip 38 to be dropped into trough 36, with wings 44 and 46 overlying the tips 32a and 34a of channel legs 32 and 34. Channel legs 32 and 34 are then pinched shut to a mating trapezoidal shape to capture tack strip 38, as shown in FIG. 3. Since wings 44 and 46 are concave downwardly, they overly and completely cover tips 32a and 34a and partly down the sides of channel legs 32 and 34 when assembly is complete. Tack strip 38 and its wings 44 and 46 are at least coextensive with the length of the bow channel to fully protect top fabric 19. Preferably tack strip 38 extends beyond the ends of bow 24 to isolate any bow end flaws from contact with top fabric 19.

Finished bow 24 is now ready for assembly to side linkages 20 and assembly into vehicle 10. Fabric 19 is now installed by stapling fabric flaps 50, that are sewn or bonded to fabric 19, through tacking surface 42 into tack strip body 40 with staples 52, for example.

As is well-known, bows 22, 24 and 26 move relative to fabric 19 during raising and lowering of top 12. As is readily apparent, the fabric will never touch metal channel leg 32a and 34a tips during top movement, but will slide over wings 44 and 46, which completely overlie them and extend partly down legs 32 and 34.

Thus the top fabric will be isolated from any contact with any sharp edges, defects or imperfections which may be carried by the channel tips because of the unique construction of the tack strips made in accordance with this invention. While only a preferred embodiment has been illustrated and described, obvious modifications thereof are contemplated within the scope of this invention and the following claims.

I claim:

1. In a convertible top having a collapsible top, frame which is movable between top raised and top lowered positions and includes a plurality of transverse bows supporting a fabric cover, an improved bow comprising an elongated U-shaped metal channel defining a trough bounded by a pair of spaced side walls interconnected at their bottom ends by a bottom wall, an elongated plastic tacking strip having a main body received in said channel for receiving fasteners to secure the fabric top to the bow, said tacking strip having a pair of wings extending therefrom beyond the lateral extent of the channel side walls to overlie the tops of the channel side walls and provide bearing surfaces for the fabric cover as it moves over the bow during top movement.

2. The improved bow of claim 1, wherein the tacking strip main body has a generally trapezoidal cross section with the wings extending laterally from a narrow upper tacking surface, and the tacking strip is secured to the channel by deforming the upper ends of the channel side walls inwardly to clinch the tacking strip body beneath the wings.

3. The improved bow of claim 1, wherein the tacking strip wings are shaped concave downwardly as they extend from the body to extend over and downwardly to embrace and overlie the tops of the channel sides.

4. A convertible top bow comprising an elongated U-shaped metal channel defining a trough bounded by a pair of spaced side walls interconnected at their bottom ends by a bottom wall, an elongated plastic tacking strip having a main body received in said channel for receiving fasteners to secure a fabric top cover to the bow, said tacking strip having a pair of wings extending therefrom beyond the lateral extent of the channel side walls to isolate the channel tops from engagement with the fabric top cover and provide bearing surfaces for the fabric top cover as it moves over the bow during top movement.

5. The bow of claim 4, wherein the tacking strip main body has a generally trapezoidal cross section with the wings extending laterally from a narrow upper tacking surface, and the tacking strip is secured to the channel by deforming the upper ends of the channel side walls inwardly to clinch the tacking strip body beneath the wings.

6. The bow of claim 4, wherein the tacking strip wings are shaped concave downwardly as they extend from the body to extend over and downwardly to embrace and overlie the tops of the channel sides.

* * * * *